June 21, 1949.  E. A. GREENLEE  2,474,048

HEATING AND VENTILATING SYSTEM

Filed June 18, 1945

INVENTOR.
Elmer A. Greenlee
BY
ATTORNEYS

Patented June 21, 1949

2,474,048

UNITED STATES PATENT OFFICE 2,474,048

HEATING AND VENTILATING SYSTEM

Elmer A. Greenlee, Rockford, Ill., assignor to Barber-Colman Company, Rockford, Ill., a corporation of Illinois Application June 18, 1945, Serial No. 600,119

2 Claims. (Cl. 236—49)

This invention relates to a heating and ventilating system particularly suited for use in public conveyances such as railway cars, which must be heated under certain conditions and cooled at other times.

One object is to provide a novel control for a system of the above character in which outdoor air is utilized advantageously to provide ventilation and also variable amounts of cooling.

The invention also resides in the simple construction of the control apparatus for carrying out the foregoing object.

Figure 1:
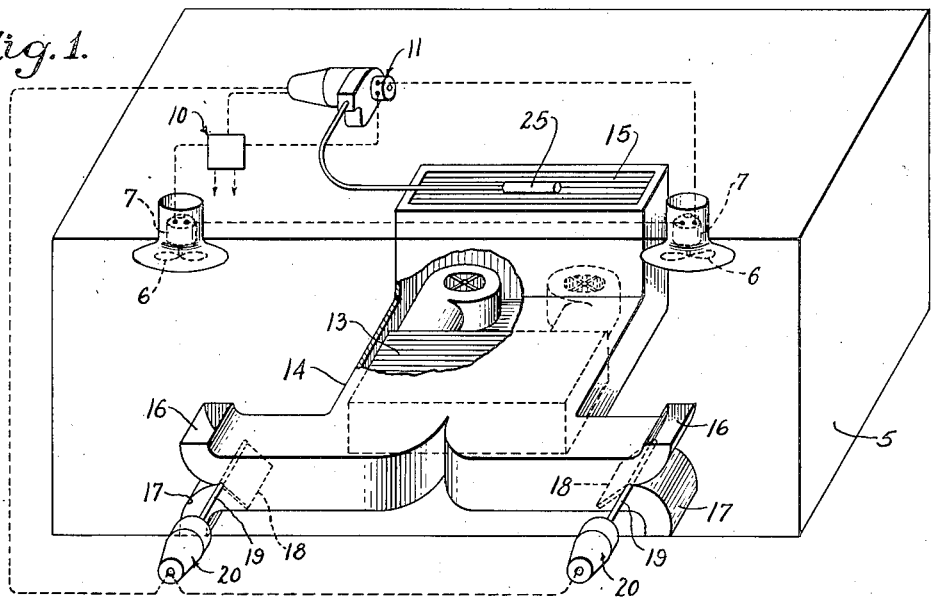

Other objects and advantages of the invention will become apparent from the following detailed description taken in connection with the accompanying drawings, in which Figure 1 is a fragmentary perspective view of a compartment equipped with a heating and ventilating system controlled in accordance with the present invention.

Figure 2:
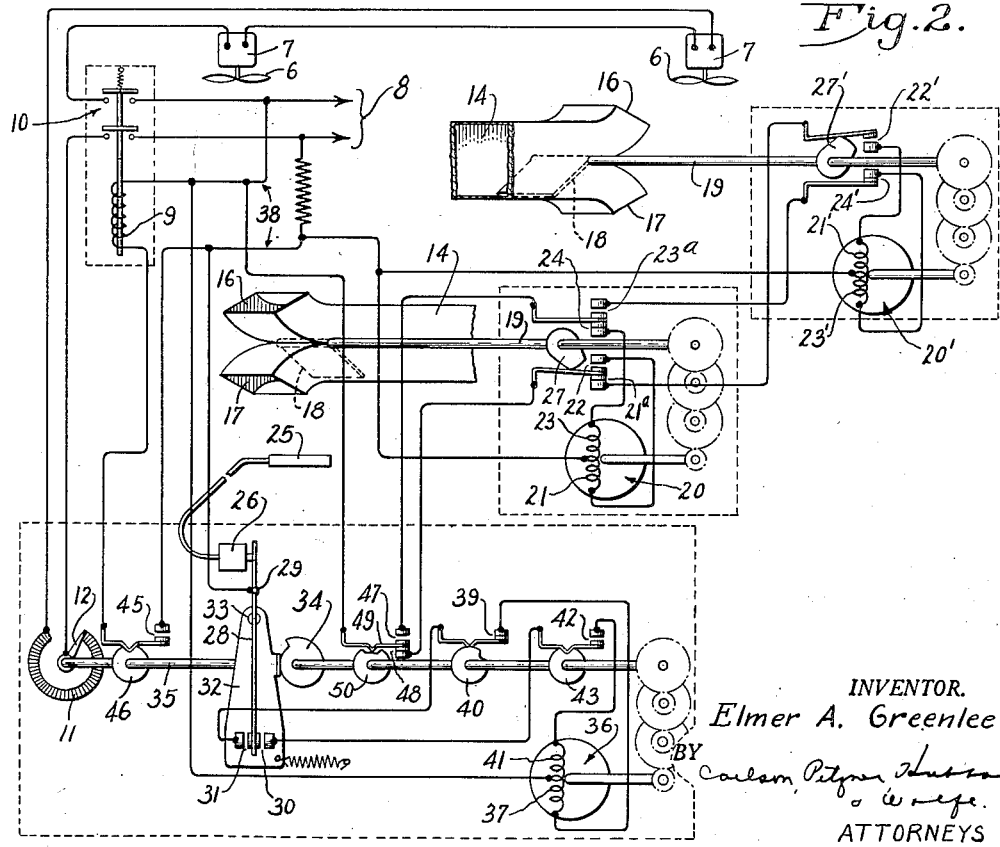

Fig. 2 is a schematic view and wiring diagram.

In the exemplary embodiment shown, the improved control is applied to the heating and cooling of a compartment 5 such as a street railway car into which outside air is drawn by fans 6 which are driven by electric motors 7 and which discharge the air downwardly into the compartment. The motors are energized from a source 8 whenever the coil 9 of a relay switch 10 is energized, the speed of operation being controlled by a rheostat 11 having a wiper 12 movable clockwise from the position shown to increase the speed of the fan motors progressively.

The heater for the compartment is of the forced air type comprising a heating element 13 which may be of the electric type arranged within a duct 14 having an inlet 15 within the compartment and a plurality of outlets 16 for discharging heated air into the compartment and a plurality of outlets 17 for alternatively delivering the heated air outside of the compartment depending on the position of dampers 18. Each of the latter is on a shaft 19 turned by a reversible electric motor 20 having a winding 21 which when energized runs the motor in a direction to close the outlet 17, the damper position being limited by opening of a switch 22 by a cam 27. When the other motor winding 23 is energized, the damper is turned to a position limited by opening of a switch 24 and closing the outlet 16 while opening the outlet 17, the air flowing through the duct 14 then being discharged outside of the compartment. The corresponding parts of the second damper operator are indicated by primed numbers and its circuits are controlled by switches 21ª and 23ª closed by the cam 27 in the opposite limit positions thereof.

The damper motors 20 and variation in the speed of the fan motor 7 are controlled in accordance with temperature changes in the compartment 5 determined by a thermostatic element 25 herein disposed in the path of the air drawn into the return air duct inlet 15. The element shown comprises a fluid filled bulb communicating through a tube with a bellows or diaphragm 26 by which a switch arm 28 is swung about a central pivot 29, clockwise as the temperature of the bulb rises and counterclockwise as the temperature falls. The other end of the arm carries the common contact of two switches 30 and 31 whose insulated contacts are on the free end of an arm 32 pivoted at 33 adjacent the pivot 29. The latter arm constitutes the follower of a cam 34 fast on a shaft 35 which carries the wiper arm 12 of the fan motor rheostat 11 and which is driven through speed reduction gearing by a reversible electric motor 36 energized from a source 38 under the control of the switches 30 and 31.

The circuit for the winding 37 extends through a limit switch 39 operated by a cam 40 on the shaft 35 and the switch 31, the shaft being turned clockwise when the winding 37 is energized and until the limit position is reached. When the switch 30 is closed, the motor winding 41 is energized and the motor turns the shaft 35 reversely until a limit switch 42 is opened by a cam 43 as shown in Fig. 2.

The periphery of the cam 34 has a progressive rise increasing in a direction such that the follower arm 32 follows the motion of the thermostatically actuated arm 28 until the switch 30 or 31 then in control of the motor 36 opens. As a result of this action, the shaft 35 is turned progressively with and in proportion to changes in the bulb temperature within a wide range, for example, 60 to 90 degrees Fahrenheit. The shaft is disposed in the limit position shown when the bulb temperature is below 60 degrees and is turned through nearly a revolution as the temperature rises to 90 degrees and the shaft reaches the limit position in which the switch 39 is opened.

In the full heating position of the shaft 35 as shown in Fig. 2, a switch 45 in the circuit of the relay coil 9 is held open by a cam 46 and the fan motor 7 is idle, no outside air being delivered to the compartment. In the initial clockwise movement of the shaft as the temperature rises above 60 degrees, the switch 45 is closed thereby starting the fan motor 7 which operates at low speed owing to the fact that the entire resistance of the rheostat 11 is included in its circuit. As the temperature rises, the resistance is decreased and the fan speed is increased progressively causing increasing amounts of fresh outside air to be delivered to the compartment.

The operation of the damper motors 20 is controlled by switches 47 and 48 whose common contact is on an arm 49 constituting the follower of a cam 50 on the shaft 35. In the full heating position of the shaft, the switch 48 is closed and remains closed until the bulb temperature has risen through part of the predetermined range, for example, to about 65 degrees. Then, the switch 48 is opened by the cam 50 and the switch 47 is closed thereby energizing the motor windings 21 and causing the motor 20 to move its damper 18 to its other limit positions. In this movement, the switch 23$^a$ is closed to initiate a similar cycle of the motor 20' for correspondingly moving the other damper. Heating of the compartment is thus discontinued until the compartment temperature again falls below 65 degrees when the heater is again rendered effectual by returning the dampers 18 to the positions shown.

To summarize, heat will be supplied to the compartment whenever the compartment temperature is within the lower small portion, for example, 60 to 65 degrees of the predetermined temperature range. The fans 6 are operated over all except the extreme lower limit of the temperature range, their speed and therefore the amount of outside air delivered to the compartment being increased progressively so as to provide the proper ventilation and cooling of the compartment to the extent that the outside air is usable for that purpose. By varying the fan speed, objectionable cold drafts on the compartment occupants are avoided.

I claim as my invention:

1. In a compartment heating and ventilating system having a heater for the compartment and a motor for driving a fan to deliver outside air into the compartment, the combination of, a thermostatic element adapted to be arranged for response to the compartment temperature, a rotary shaft, reversible electric motor driving means for said shaft, switching means actuated by said element and said shaft and controlling the direction and extent of operation of said driving means to cause said shaft to turn in proportion to temperature changes of said element through a predetermined range, means actuated by said shaft and operable to maintain said fan motor idle when said temperature is at the lower limit of said range, to energize the fan motor upon a rise in temperature, and then increase the fan motor speed progressively as the temperature rises through said range, and means actuated by said shaft and controlling said heater to maintain the latter operative in the lower part of said temperature range and ineffectual in the upper part of the range.

2. In a combined compartment heating and ventilating system having a heater for the compartment and a motor for driving a fan to deliver outside air into the compartment, the combination of, a thermostat adapted to be arranged for response to temperature changes in said compartment over a substantial range, means controlled by said thermostat and operating to maintain said heater effectual over the lowermost small portion of said range and ineffectual over the remaining higher part of the range, and means controlled by said thermostat to maintain said fan motor idle at the lowermost limit of said range and responsive to a rise in temperature from such lowermost limit to initiate operation of said fan motor at low speed and then increase the motor speed progressively as the temperature increases throughout the remainder of the range.

ELMER A. GREENLEE.

REFERENCES CITED

The following references are of record in the file of this patent:

UNITED STATES PATENTS

| Number | Name | Date |
|---|---|---|
| 1,949,735 | Bulkeley | Mar. 6, 1934 |
| 1,989,972 | Cunningham | Feb. 5, 1935 |
| 2,206,009 | Cummings | June 25, 1940 |